Patented Jan. 1, 1952

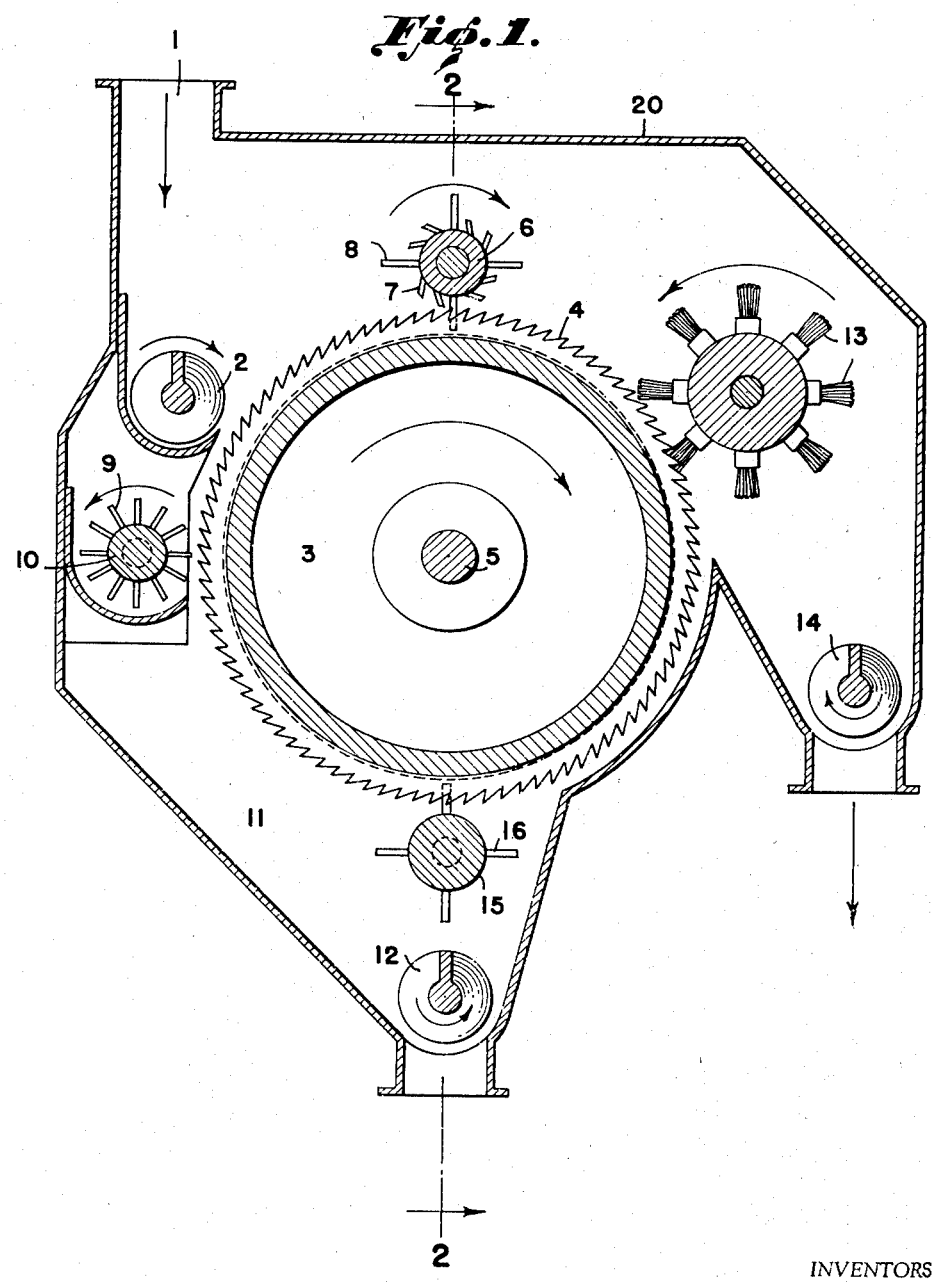

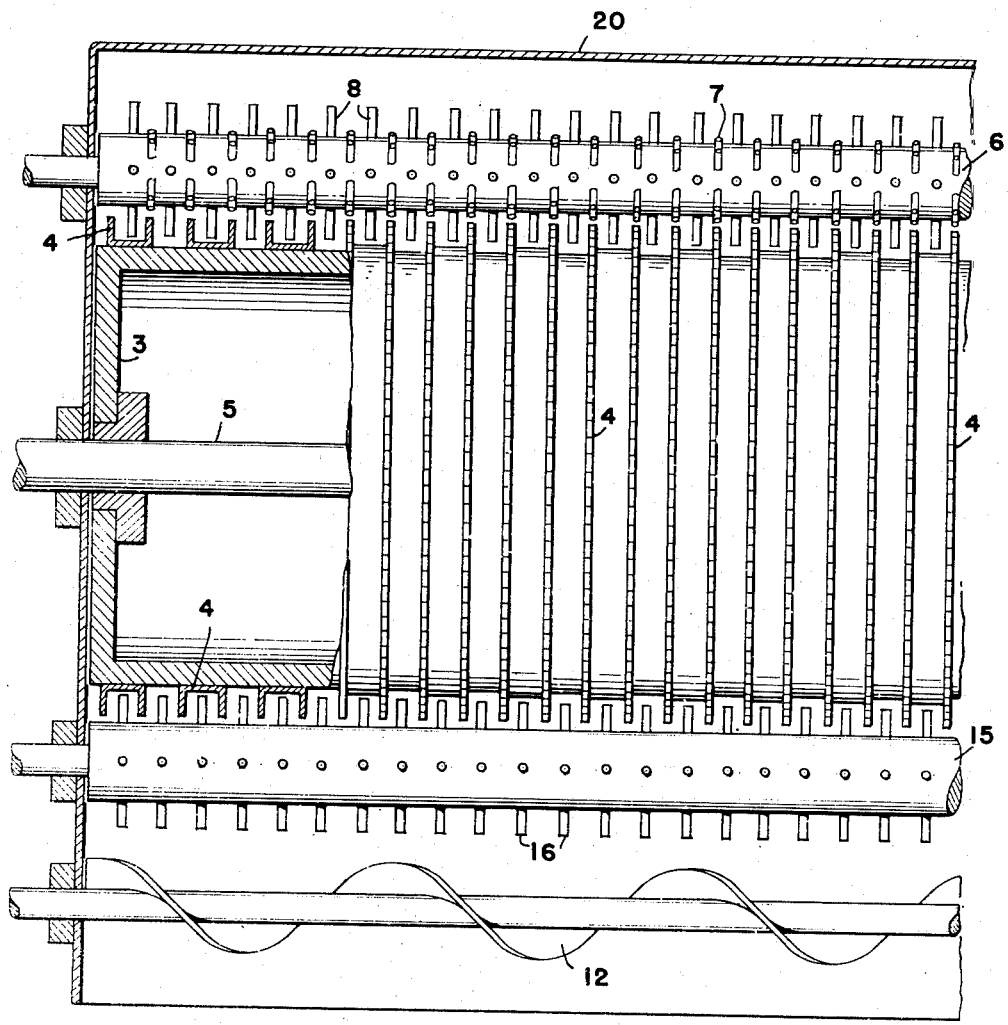

2,580,451

UNITED STATES PATENT OFFICE 2,580,451

STICK REMOVER FOR SEED COTTON EXTRACTING MACHINES

Charles M. Merkel and Thomas E. Wright, Leland, Miss.; dedicated to the free use of the People in the territory of the United States Application August 11, 1950, Serial No. 178,948

1 Claim. (Cl. 19—37)

(Granted under the act of March 3, 1883, as amended April 30, 1928; 370 O. G. 757)

The invention herein described may be manufactured and used by or for the Government of the United States for governmental purposes throughout the world without the payment to us of any royalty thereon.

We hereby dedicate the invention herein described to the free use of the People in the territory of the United States to take effect on the granting of a patent to us.

This invention is directed to improvements in a seed cotton hull extracting machine. It particularly relates to an improvement in the stripper rollers employed to clean the saw cylinder.

One embodiment of the invention is illustrated in the drawings in which:

Figure 1 is a vertical cross-section; and

Figure 2 is a cross-section on the plane 2—2.

Referring to Figure 1, seed cotton entering the casing 20 at 1 is distributed by means of spiral conveyor 2 and is thrown upon saw drum 3. Drum 3 rotates clockwise. The drum carries a series of parallel coarse tooth channel saws 4, mounted at right angles to the axis 5 of the drum. These saws seize cotton locks from conveyor 2 and carry them under primary stripper roller 6. The stripper roller 6 also rotates clockwise. Roller 6 carries non-radial stripper bars 7 which extend rearwardly, in the direction opposite to its movement. Roller 6 also carries longer elements 8, termed clearing fingers. These fingers 8 preferably extend radially from the roller, and enter the spaces between the saws 4, as shown in Figure 2. The bars 7 and the clearing fingers 8, moving against the flow of seed cotton, on the drum, strip sticks and many hulls from the seed cotton, permitting only impaled sticks and limbs to pass under the stripper bars along with the cotton.

The loose hulls and sticks removed by elements 7 and 8 are thrown back into conveyor 2 and carried to an end or center exit (not shown) from which it drops down into chamber 9 and onto spiral picker roller 10. Roller 10 carries the foreign matter to a discharge exit (not shown) from which it drops down into the hopper 11, to conveyor 12.

The saw drum 3 carries the cotton locks under the brush 13, which doffs the locks to cotton discharging conveyor 14.

Ordinarily, it has been necessary to stop the machine periodically to pick the speared sticks and limbs from the saw teeth. This is obviated by our invention. The radial spikes or fingers 8 project below and between the saw blades, thereby breaking up and removing sticks and other foreign matter impaled or caught on the saw teeth.

A second stripper roller 15 is provided with radial fingers 16. Roller 15 rotates clockwise. Fingers 16 remove or macerate sticks and foreign material missed by roller 6 and doffer 13.

The principles described above can be applied to unit extractors known in the art as extractor-feeders, and also to big bur machines having another type of spreading system.

Having thus described our invention we claim:

A seed cotton hull extractor machine, comprising: a casing, an upper inlet for cotton toward the rear of the casing, a drum mounted for rotation about an axis longitudinally of said casing, the upper drum surface moving forwardly away from the inlet, the drum having a series of axially spaced circular saw blades mounted on its surface at right angles to the drum axis, a stripper roller mounted for rotation about an axis above and longitudinal to the axis of the drum, long radial clearer fingers projecting from said roller and extending below and between the saw blades, shorter rod bars projecting angularly from the roller and in a direction opposite its direction of movement, the roller rotating in the same direction as the drum, the outer edges of the bars passing opposite and adjacent to the outer edges of the saw teeth, the bars being spaced circumferentially on said roller and also being spaced axially thereon, and being aligned with the circular saw blades, conveyor means to feed the cotton to the toothed surface of the drum and to carry off the sticks and other foreign matter removed from the drum surface by the roller to the lower part of the casing, a second stripper roller mounted beneath the drum having long radial fingers projecting between the saw blades, and a conveyor beneath the second roller to carry off foreign matter removed by both stripper rollers, the axes of the two stripper rollers and of the drum being in vertical alignment.

CHARLES M. MERKEL.
THOMAS E. WRIGHT.

REFERENCES CITED

The following references are of record in the file of this patent:

UNITED STATES PATENTS

| Number | Name | Date |
|---|---|---|
| 198,105 | Gwathney | Dec. 11, 1877 |
| 1,894,182 | Lesikar | Jan. 10, 1933 |
| 1,981,575 | Wallace | Nov. 20, 1934 |
| 2,016,017 | Muirhead | Nov. 1, 1935 |